(12) United States Patent
Wei et al.

(10) Patent No.: US 12,553,877 B2
(45) Date of Patent: Feb. 17, 2026

(54) TESTING DEVICE AND METHOD FOR INTERFACE MECHANICAL PARAMETERS OF HYDRATED SOIL CONTAINING NATURAL GAS

(71) Applicant: INSTITUTE OF ROCK AND SOIL MECHANICS, CHINESE ACADEMY OF SCIENCES, Wuhan (CN)

(72) Inventors: Houzhen Wei, Wuhan (CN); Li Xin, Wuhan (CN); Qiang Xue, Wuhan (CN); Xiang Sun, Wuhan (CN); Xiaolong Ma, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 312 days.

(21) Appl. No.: 18/452,543

(22) Filed: Aug. 20, 2023

(65) Prior Publication Data

US 2024/0361295 A1 Oct. 31, 2024

(30) Foreign Application Priority Data

Apr. 27, 2023 (CN) .......................... 202310475599.3

(51) Int. Cl.
*G01N 3/24* (2006.01)
*G01N 13/00* (2006.01)
*G01N 33/00* (2006.01)
*G01N 33/24* (2006.01)

(52) U.S. Cl.
CPC ......... *G01N 33/24* (2013.01); *G01N 33/0016* (2013.01)

(58) Field of Classification Search
CPC .. G01N 3/00; G01N 3/12; G01N 3/24; G01N 13/00; G01N 33/00; G01N 33/0016; G01N 33/24
See application file for complete search history.

(56) References Cited

U.S. PATENT DOCUMENTS

| 12,392,761 B1 * | 8/2025 | Song ....................... G01N 33/24 |
| 2023/0033460 A1 * | 2/2023 | Kong ....................... G01N 3/24 |

FOREIGN PATENT DOCUMENTS

KR 101155552 B1 * 6/2012 ............... G01N 3/24

OTHER PUBLICATIONS

Machine Translation of KR-101155552-B1 (Year: 2012).*

* cited by examiner

*Primary Examiner* — Nguyen Q. Ha
(74) *Attorney, Agent, or Firm* — Platinum Intellectual Property PC

(57) ABSTRACT

The present invention provides a testing device and method for determining interface mechanical parameters of natural gas hydrated soil. The testing device includes a reaction kettle, a rotating power mechanism, a sample loading mechanism, a pressure mechanism, an atmosphere regulating mechanism, and a temperature regulating mechanism. The testing method is implemented based on this device. The device and method can improve accuracy and reliability of determining mechanical parameters at an interface of hydrated soil containing natural gas.

10 Claims, 3 Drawing Sheets

TESTING DEVICE AND METHOD FOR INTERFACE MECHANICAL PARAMETERS OF HYDRATED SOIL CONTAINING NATURAL GAS

RELATED APPLICATIONS

This application is a Non-provisional Application under 35 USC § 111(a), which claims priority to Chinese Patent Application No. 202310475599.3, filed Apr. 27, 2023, the disclosure of all of which is hereby incorporated by reference in its entirety.

TECHNICAL FIELD

The present invention relates to the field of geotechnical mechanics testing technology, in particular to a testing device and a testing method for determining mechanical parameters at an interface of hydrated soil containing natural gas.

BACKGROUND TECHNOLOGY

Natural gas hydrates are cage like compounds formed by natural gas molecules such as methane ($CH_4$) and water molecules under high pressure and low temperature conditions. In today's energy shortage situation, natural gas hydrates, as a new type of clean energy, have brought enormous commercial value. Natural gas hydrates are usually distributed in permafrost areas on land and shallow sediments in the deep sea. They have low shear strength and a thin overlying soil layer. The effective cementation of hydrates in the sedimentary layer closes the pores in the soil, preventing a large amount of methane gas from entering the atmosphere. However, unreasonable exploitation of natural gas hydrates may lead to geological disasters such as submarine landslides, marine strata subsidence, and wellbore instability. Although scholars at home and abroad have conducted extensive research on natural gas hydrates, the mechanical issues related to large deformation and local discontinuity at the contact surface of natural gas hydrated soil are still unclear, and the testing of key interface mechanical parameters is not accurate. Therefore, using indoor ring shear tests to test the mechanical parameters of the interface of natural gas hydrated soil is of great significance for the extraction of natural gas hydrates and the prevention and control of geological disasters.

SUMMARY OF THE INVENTION

In view of this, the present invention provides a testing device and method for determining interface mechanical parameters of natural gas hydrated soil, aiming to solve the problem of how to carry out effective indoor tests for ring shear tests of natural gas hydrated soil under different pressure and temperature conditions, thereby improving the accuracy and reliability of obtaining interface mechanical parameters of natural gas hydrated soil in high pressure and low temperature environments, and making it more suitable for practical use.

In order to achieve the first purpose mentioned above, the technical scheme of the interface mechanical parameter testing device for determining interface mechanical parameters of hydrated soil containing natural gas provided by the present invention is as follows:

The interface mechanical parameter testing device for containing natural gas hydrated soil provided by the present invention includes a reaction kettle, a rotating power mechanism, a sample loading mechanism, a pressure mechanism, an atmosphere regulating mechanism, and a temperature regulating mechanism, The sample to be tested (202) is set on the sample loading mechanism, and the sample to be tested (202) and the sample loading mechanism are jointly located in the first holding chamber of the reaction kettle;

The rotating power mechanism outputs rotating power through the output axis to the sample loading mechanism, causing the sample loading mechanism to rotate;

The pressure mechanism provides testing pressure to the test sample through the sample loading mechanism;

The atmosphere regulating mechanism regulats the atmosphere composition and gas pressure in the first holding chamber;

The temperature regulating mechanism regulates the temperature in the first holding chamber.

The interface mechanical parameter testing device for containing natural gas hydrated soil provided by the present invention can further be achieved by adopting the following technical measures.

Preferably, the sample loading mechanism comprises a lower shear box (201) and an upper shear box (203), The sample to be tested (202) is set between the lower shear box (201) and the upper shear box (203).

Preferably, the rotating power mechanism comprises a rotating motor (103), a driving gear (104), and a driven gear (105), The output shaft of the rotating motor (103) is fixedly connected to the core shaft of the driving gear (104), The position of the spindle of the driven gear (105) is fixed, The driven gear (105) meshes with the driving gear (104);

The sample loading mechanism is concentric with the driven gear (105), causing the sample loading mechanism to rotate coaxially with the driven gear (105).

Preferably, the pressure mechanism comprises a pressure cap (301), a piston rod (304), and a piston limit member, The pressure cap (301) is pressed against the sample loading mechanism through its feet, The piston limiting member is fixedly connected to the reaction kettle, The reaction kettle is provided with a through hole, and the piston limit member is provided with a blind hole. The through hole is aligned with the blind hole, and one end of the piston rod (304) is arranged in the blind hole, the other end of the piston rod (304) passes through the through hole and is connected to the pressure cap (301) through a bearing (302);

The piston rod (304), the side wall of the blind hole, and the side wall of the through hole both form a moving pair, by adjusting the displacement of the piston rod (304), the force applied by the piston rod (304) to the pressure cap (301) is adjusted.

Preferably, the interface mechanical parameter testing device for containing natural gas hydrated soil also includes a pressure medium supply mechanism;

The blind hole has a first expanding section in the middle part;

The piston rod has a second expanding section in the middle part;

The axial height of the first expanding segment is greater than that of the second expanding segment, resulting in the first expanding segment being separated by the second expanding segment to form an upper and lower containing cavities, The pressure medium supply mechanism is respectively connected to the upper and lower holding cavities, and the displacement of the piston rod (304) is adjusted by adjusting the volume of the pressure medium flowing into the upper or lower holding cavities.

Preferably, the interface mechanical parameter testing device for containing natural gas hydrated soil also includes a displacement sensor (801), The displacement sensor (801) is used to indicate the displacement of the piston rod (304).

Preferably, the atmosphere regulating mechanism comprises a first gas cylinder (502), a vacuum pump (601), and a gas pipeline, The first gas cylinder (502) is connected to the upper and lower holding chambers respectively through the gas pipeline, so that the displacement of the piston rod (304) can be adjusted by changing the gas volume flowing into the upper and lower holding chambers;

The vacuum pump is connected to the first holding chamber through a gas pipeline, enabling the first holding chamber to be adjusted to a set vacuum degree by the vacuum pump.

Preferably, the atmosphere regulating mechanism also includes a gas recovery device (510), The gas recovery device (510) is connected to the first holding chamber through the gas pipeline, enabling the application of the interface mechanical parameter testing device containing natural gas hydrated soil to complete the testing test and recover the working gas to the gas recovery device (510).

Preferably, the temperature regulating mechanism comprises a constant temperature box (401) and a temperature sensor (802), The reaction kettle is arranged in the constant temperature box (401), The temperature sensor (802) is used to indicate the temperature inside the incubator (401).

In order to achieve the second purpose mentioned above, the technical scheme of the interface mechanical parameter testing method for determining interface mechanical parameters of hydrated soil containing natural gas provided by the present invention is as follows:

The interface mechanical parameter testing method of containing natural gas hydrated soil provided by the present invention is based on the interface mechanical parameter testing device for containing natural gas hydrated soil provided by the present invention, the method for testing interface mechanical parameters of natural gas hydrated soil includes the following steps:

Obtain a soil sample to be tested;

Loading the soil sample to be tested into the sample loading mechanism;

Assemble the sample loading mechanism to any of the interface mechanical parameter testing devices for containing natural gas hydrated soil as claimed in claims 1-9;

Start the atmosphere regulating mechanism, remove impurities and gases from the reaction kettle, and obtain a reaction kettle with a set vacuum degree;

Fill the reaction kettle with a set vacuum degree with working gas, so that the gas pressure in the reaction kettle reaches the set pressure;

Wait until the working gas penetrates into the soil sample to be tested;

Start the temperature regulating mechanism to stabilize the temperature inside the reaction kettle to the set temperature;

Synthesize the hydrated soil sample containing natural gas under the set pressure and temperature conditions;

Activate the pressure mechanism to apply working pressure to the hydrated soil sample containing natural gas;

Activate the rotating power mechanism to rotate the natural gas hydrated soil sample at a set speed, and perform a ring shear test on the natural gas hydrated soil sample until the end of the ring shear test;

Unload the hydrated soil sample containing natural gas and recover the working gas.

The interface mechanical parameter testing device and method provided by the present invention for natural gas hydrated soil can effectively measure the interface mechanical parameters of different natural gas hydrated soil through indoor experiments, providing a theoretical basis for practical engineering sites. In addition, the interface mechanical parameter testing device and testing method of natural gas hydrated soil provided by the present invention also have the following beneficial effects:

(1) The present invention maintains a stable temperature inside the reaction kettle through a constant temperature box and a thermal conductive interlayer inside the reaction kettle, maintaining the pressure inside the reaction kettle not changing with temperature; Real time monitoring of the temperature inside the reactor through temperature sensors allows for timely adjustment of the temperature to the appropriate value; The pressure inside the reactor is adjusted through multiple pressure regulating valves, and real-time monitoring of the pressure inside the reactor is carried out through pressure sensors to timely adjust the pressure inside the reactor to the appropriate value. Effectively simulate the in-situ generation environment of hydrated soil containing natural gas by controlling the temperature and pressure inside the reactor.

(2) The present invention simulates the pressure of the overlying soil layer containing natural gas hydrated soil by setting a piston rod above the pressure cap and simulating the pressure of the overlying soil layer containing natural gas hydrated soil. The pressure inside the piston chamber is maintained stable through a pressure regulating valve and a pressure sensor, thereby maintaining the stability of the pressure on the sample to simulate the overlying soil layer pressure and engineering environment containing natural gas hydrated soil.

(3) The present invention adopts a ring shear test device to obtain interface mechanical parameters of different natural gas hydrated soils under large deformation. In addition, the roughness of the contact interface is changed by changing the shape and size of the protrusion on the lower shear box, thereby enabling the present invention to better simulate more on-site working conditions.

(4) The present invention adopts automatic data collection and calculation, high-precision adjustment of various parameters required for testing, high degree of automation, and reduction of unnecessary errors.

DESCRIPTION OF FIGURES

By reading the detailed description of the preferred embodiments below, various other advantages and benefits will become clear to ordinary technical personnel in this field. The accompanying drawings are only intended to illustrate the preferred embodiments and are not considered a limitation of the present invention. And throughout the entire figure, the same reference symbols are used to represent the same components. In the attached figure.

Figure 1:
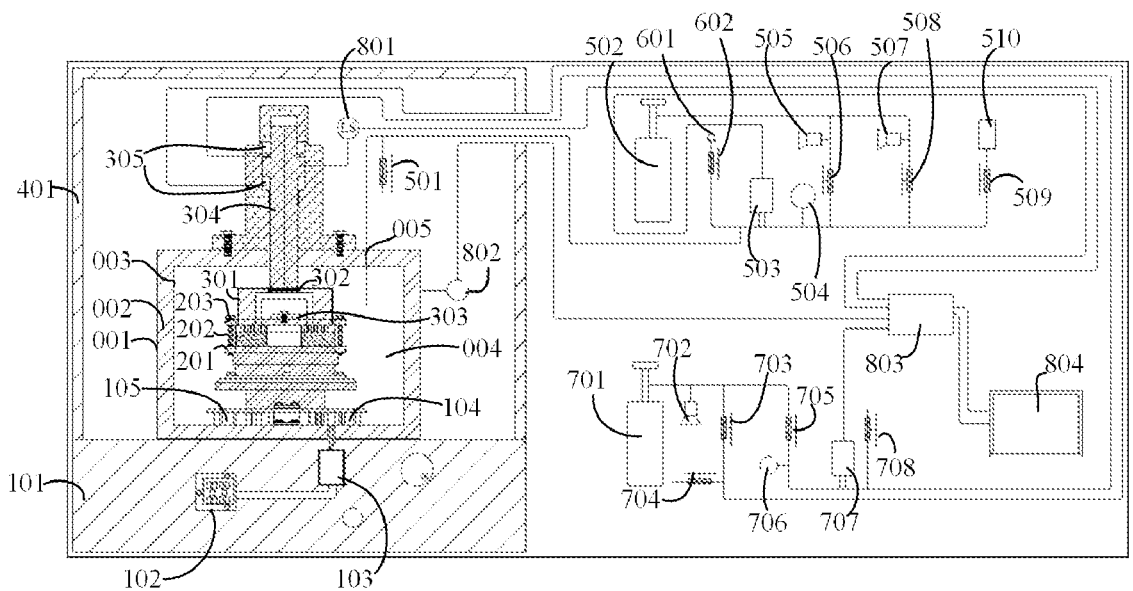
FIG. 1 is a schematic diagram of the overall structure of the interface mechanical parameter testing device for hydrated soil containing natural gas provided in the embodiment of the present invention.

001—Reaction kettle shell; 002—Thermal conductive interlayer; 003—Reactor liner; 004—Inner chamber of reaction kettle; 005—Pressure pipe inlet and outlet; 101—Control console; 102—Shear rate controller; 103—Rotating motor; 104—Driving gear; 105 driven gear; 201—Lower shear box; 202—Sample; 203—Upper shear box; 301 pressure cap; 302—Bearing; 303—Fixed plate; 304—Piston Rod; 305 piston; 401—Thermostat; 501—First vent valve; 502—First cylinder; 503—First pressure sensor; 504—First pressure gauge; 505—First pressure regulating valve; 506—High pressure valve; 507—Second pressure regulating valve; 508—Low pressure valve; 509—Gas recovery valve; 510—Gas recovery device; 601—Vacuum pump; 602—Vacuum valve; 701—Second cylinder; 702—Third pressure regulating valve; 703—Reset valve; 704—Second vent valve; 705—Pressure valve; 706—Second pressure gauge; 707—Second pressure sensor; 708—Reset the vent valve; 801—displacement sensor; 802—temperature sensor; 803—Signal processor; 804—Data acquisition and feedback device.

EMBODIMENT

In view of this, the present invention provides a testing device and method for determining interface mechanical parameters of natural gas hydrated soil, aiming to solve the problem of how to carry out effective indoor tests for ring shear tests of natural gas hydrated soil under different pressure and temperature conditions, thereby improving the accuracy and reliability of obtaining interface mechanical parameters of natural gas hydrated soil in high pressure and low temperature environments, and making it more suitable for practical use.

After arduous efforts, the inventor discovered that:

The study of the mechanical characteristics of the contact surface between structures and soil is an important component of soil mechanics research. By using an indoor shear test device and simulating in-situ conditions such as pressure, temperature, and overlying soil pressure at the formation site of natural gas hydrated soil, the relationship between mechanical parameters of the interface of natural gas hydrated soil and pressure, temperature, and burial depth is studied, providing a theoretical basis for on-site mining of natural gas hydrated soil.

In the existing technology, the research on the interface mechanical properties of hydrated soil containing natural gas is still incomplete. At present, in the existing testing equipment for interface mechanical indicators of natural gas hydrated soil, methane is introduced into the pressure chamber and cooled to form natural gas hydrated soil. Then, under the action of axial force, horizontal load is applied to cause shear deformation between the hydrated soil sample and the structural plane, thereby measuring the contact interface shear parameters of natural gas hydrated soil. However, its disadvantage lies in the inability to change the roughness of the contact interface, and the inability to test the mechanical parameters of the interface of natural gas hydrated soil under large deformation. Moreover, there is a significant difference between the generation mode of natural gas hydrates and the in-situ hydrate generation mode. According to existing data, hydrated soil containing natural gas is mainly found in non diagenetic formations within 300 meters below the seabed. Its water depth is mostly over 1000 meters, the pressure is as high as 20 MPa, and the temperature is below 10° C. Therefore, the device simulating the generation of natural gas hydrated soil should fully consider factors such as the pressure, temperature, and pressure of the overlying soil layer in its environment, so that the indoor genesis of natural gas hydrated soil is closer to the in-situ genesis.

In recent years, the main testing method for interface mechanical parameters of natural gas hydrated soil is direct shear test, which has the advantages of simple structure and easy operation. Its disadvantage is that the shear plane is artificially defined on the plane between the upper and lower shear boxes, rather than the actual shear plane of soil sample shear failure; Furthermore, the distribution of shear stress on the shear plane is uneven, and the shear failure of the soil sample begins at the edge. Due to limited research on the testing of interface mechanical parameters of natural gas hydrated soil both domestically and internationally, it is not possible to rely solely on the interface mechanical parameters measured by direct shear devices to guide practical engineering. It is more necessary to conduct other indoor tests that are more suitable for actual working conditions to test the interface mechanical parameters of natural gas hydrated soil.

Therefore, there are urgent issues to be solved in the determination of mechanical parameters at the interface of natural gas hydrated soil: (1) it is difficult to simulate the in-situ generation environment of natural gas hydrated soil in indoor experiments. In order to match it, it is necessary to fully consider the overlying soil pressure of natural gas hydrated soil, as well as factors such as temperature and pressure inside the simulation device, in order to effectively simulate the in-situ generation environment of natural gas hydrated soil; (2) The existing measurement of mechanical parameters of the contact surface mainly involves the measurement of mechanical properties of the contact surface between soil and structures, with few samples containing natural gas hydrated soil generated in the device. Therefore, there is an urgent need for an indoor testing device that can directly generate samples containing natural gas hydrated soil in the testing device; (3) The existing testing devices for interface mechanical parameters of natural gas hydrated soil face problems such as artificially defined shear planes and uneven stress distribution. Therefore, there is an urgent need for a testing device that can reflect the true shear plane and shear process to obtain interface mechanical parameters of natural gas hydrated soil; (4) The existing testing device for interface mechanical parameters of natural gas hydrated soil faces the problem of not always maintaining contact between the test soil sample and the contact surface, which reduces the accuracy of the interface mechanical parameters measured in the experiment. Therefore, there is an urgent need for a testing device that can maintain contact between the soil sample and the structural surface to ensure the accuracy and reliability of the interface mechanical parameters of natural gas hydrated soil.

In order to further elaborate on the technical means and effectiveness adopted by the present invention to achieve the intended invention purpose, the following is a detailed description of the interface mechanical parameter testing device and method for natural gas hydrated soil proposed based on the present invention, with reference to the attached drawings and preferred embodiments. The specific implementation formula, structure, features, and effectiveness are as follows. In the following explanation, different "embodiments" or "embodiments" may not necessarily refer to the same embodiment. In addition, specific features, structures, or features in one or more embodiments may be combined in any suitable form.

The term "and/or" in this article is only a description of the association relationship between related objects, indicating that there can be three types of relationships, such as A and/or B. Specifically, it can include both A and B, and can exist separately as A or B, which can have any of the above three situations.

Figure 2:
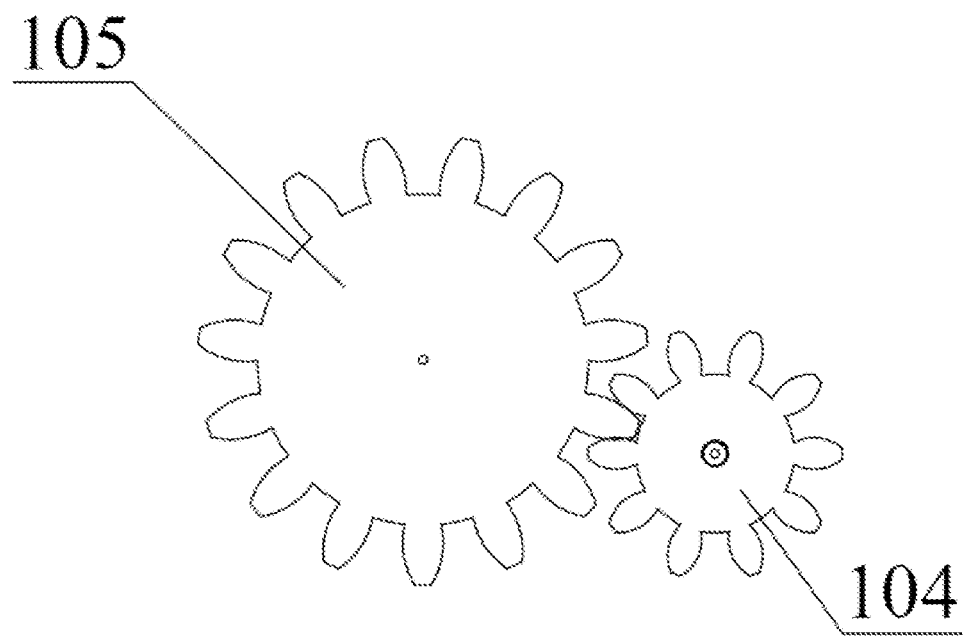
FIG. 2 is a schematic diagram of the meshing relationship between the driving gear and the driven gear used in the interface mechanical parameter testing device containing natural gas hydrated soil provided by the embodiment of the present invention.
Figure 3:
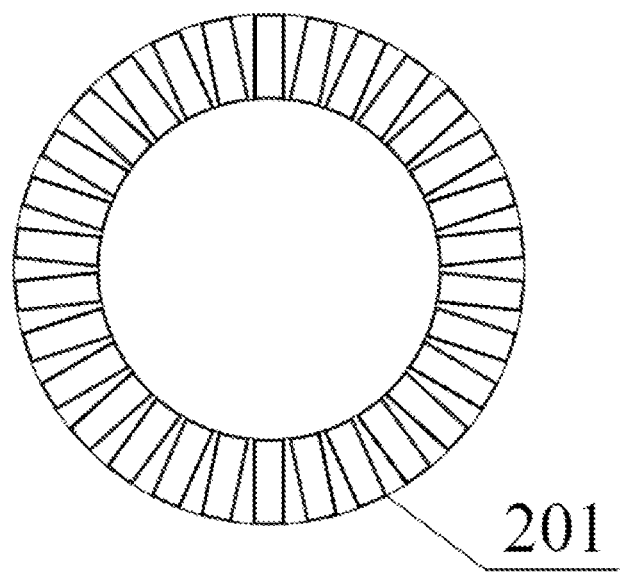
FIG. 3 shows a typical structural diagram of the lower shear box applied in the interface mechanical parameter testing device of natural gas hydrated soil provided by the embodiment of the present invention in one direction.
Figure 4:
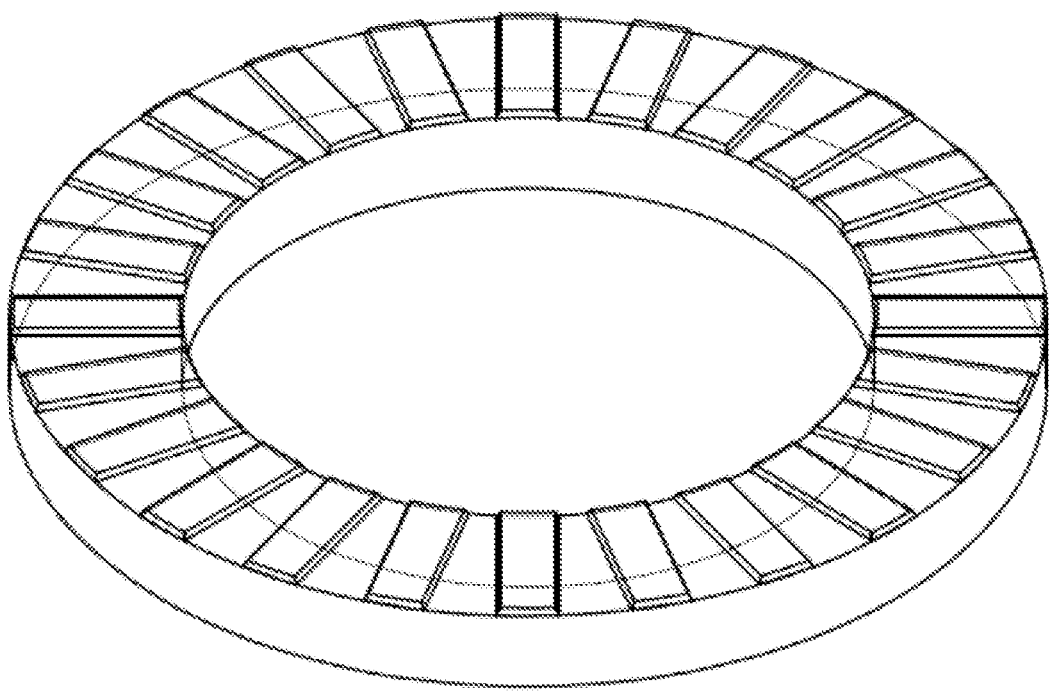
FIG. 4 shows the three-dimensional structure diagram of the lower shear box in another direction applied in the interface mechanical parameter testing device of natural gas hydrated soil provided by the embodiment of the present invention; Explanation of attached drawing markings.

Interface Mechanical Parameter Testing Device for Hydrated Soil Containing Natural Gas Referring to FIGS. 1 to 4, the interface mechanical parameter testing device for hydrated soil containing natural gas provided by the embodiment of the present invention includes a reaction kettle, a rotating power mechanism, a sample loading mechanism, a pressure mechanism, an atmosphere regulating mechanism, and a temperature regulating mechanism. The test sample 202 is set on the sample loading mechanism, and both the test sample 202 and the sample loading mechanism are located in a first holding chamber of the reaction kettle; The rotating mechanism outputs rotational power through an axial sample loading mechanism, causing the sample loading mechanism to rotate; The pressure mechanism provides testing pressure to the sample to be tested through the sample loading mechanism; The atmosphere regulating mechanism regulates atmosphere composition and gas pressure in the first holding chamber; The temperature regulating mechanism regulates a temperature in the first holding chamber.

Among them, the sample loading mechanism includes a lower shear box 201 and an upper shear box 203. The test sample 202 is set between the lower shear box 201 and the upper shear box 203. In this case, it can make it more convenient to assemble the test sample 202 into the interface mechanical parameter testing device provided by the embodiment of the present invention, which can achieve accurate and reliable testing of the interface mechanical parameters of the natural gas hydrated soil.

Among them, the rotating power mechanism includes a rotating motor 103, a driving gear 104, and a driven gear 105. The output shaft of the rotating motor 103 is fixedly connected to the core shaft of the driving gear 104, the position of the core shaft of the driven gear 105 is fixed, and the driven gear 105 meshes with the driving gear 104; The sample loading mechanism is concentric with the driven gear 105, causing the sample loading mechanism to rotate coaxially with the driven gear 105. In general, by changing the transmission ratio between the driving gear 104 and the driven gear 105, the rotational speed of the driven gear 105 can be more conveniently adjusted, thereby making it easier to control the ring shear rotation rate of the test specimens loaded in the interface mechanical parameter testing device containing natural gas hydrated soil.

Among them, the pressure mechanism includes a pressure cap 301, a piston rod 304, and a piston limit member. The pressure cap 301 is pressed against the sample loading mechanism through its foot, and the piston limit member is fixedly connected to the reaction kettle. There is a through hole on the reaction kettle, and a blind hole is opened on the piston limit member. The through hole is aligned with the blind hole. One end of the piston rod 304 is set in the blind hole, and the other end of the piston rod 304 passes through the through hole and is connected to the pressure cap 301 through a bearing 302; The piston rod and the side wall of the blind hole, as well as the side wall of the through hole, form a moving pair. By adjusting the displacement of the piston rod 304, the force exerted by the piston rod 304 on the pressure cap 301 is adjusted. In this case, the force applied to the pressure cap 301 can be more evenly applied to the test specimen 202 through the pressure cap 301, thus making the test specimen more uniformly stressed.

Among them, the interface mechanical parameter testing device for natural gas hydrated soil also includes a pressure medium supply mechanism. The blind hole has a first expanding segment in the middle part; The piston rod has a second expanding section in the middle part; The axial height of the first expanding segment is greater than that of the second expanding segment, causing the first expanding segment to be separated by the second expanding segment to form an upper and lower containing cavities. The pressure medium supply mechanism is connected to the upper and lower containing cavities respectively, and the displacement of the piston rod 304 is adjusted by adjusting the volume of the pressure medium entering the upper or lower containing cavities. In this case, by filling the upper containing cavity with pressure medium (such as pressure gas, hydraulic oil, etc.), the piston rod 304 can be pushed downward to increase the force acting on the pressure cap 301; By filling the lower containing cavity with pressure medium (such as pressure gas, hydraulic oil, etc.), the piston rod 304 can be pushed upward to reduce the force acting on the pressure cap 301.

Among them, the interface mechanical parameter testing device for natural gas hydrated soil also includes a displacement sensor 801. The displacement sensor 801 is used to indicate the displacement of piston rod 304. In this case, the displacement of the piston rod 304 can be obtained through the displacement sensor 801, making it more convenient to adjust the force acting on the pressure cap 301.

Among them, the atmosphere regulating mechanism includes a first gas cylinder 502, a vacuum pump 601, and a gas pipeline. The first gas cylinder 502 is connected to the upper and lower holding chambers respectively through a gas pipeline, so that the displacement of the piston rod 304 can be adjusted by changing the volume of gas flowing into the upper and lower holding chambers; The vacuum pump is connected to the first holding chamber through a gas pipeline, enabling the first holding chamber to be adjusted to the set vacuum degree by the vacuum pump. In this case, it is possible to use the first gas cylinder 502 and the gas pipeline matched with it to achieve pneumatic operation of the piston rod 304; By using the vacuum pump 601 and the gas pipeline in conjunction with it, it is convenient to remove foreign gases from the first holding chamber of the reaction kettle.

Among them, the gas recovery device 510 is connected to the first holding chamber through a gas pipeline, enabling the application of the interface mechanical parameter testing device containing natural gas hydrated soil to complete the testing test, and the working gas can be recovered to the gas recovery device 510. In this case, the working gas can be recovered through the gas recovery device 510, which can avoid resource waste or environmental pollution.

Among them, the temperature regulating mechanism includes a constant temperature box 401 and a temperature sensor 802. The reaction kettle is set inside the constant temperature box 401, and the temperature sensor 802 is used to indicate the temperature inside the constant temperature box 401. In this case, using a constant temperature box 401 can provide a suitable testing temperature for the reaction kettle.

Specifically, the reaction kettle subsystem includes a reaction kettle shell 001, a thermal conductivity interlayer 002, and a reaction kettle inner liner 003. The thermal conductivity interlayer 002 is internally connected to the reaction kettle inner liner 003 and externally connected to the reaction kettle 001. The material is good thermal conductivity materials such as boron nitride and aluminum oxide, which makes the external temperature of the reaction kettle easy and stable to pass into the reaction kettle inner cavity 004; The material of the reactor inner liner 003 is titanium alloy, which prevents corrosion and fracture during the in-situ generation process of simulated hydrated soil containing natural gas; The material of the reactor shell 001 is stainless steel, which protects the inside of the reactor from damage; Methane gas enters the reactor chamber 004 through the inlet and outlet 005 of the pressure pipe from the gas supply and recovery subsystem for inflation; There is a temperature sensor 802 attached to the shell 001 of the reaction kettle, which is used to monitor the temperature of the reaction kettle and connect it to the signal processor 803 through wired means. The signal transmission of the data acquisition and feedback device 804 is quickly obtained, so that the temperature of the inner chamber 004 of the reaction kettle can be controlled in a timely manner.

The shear rate control subsystem includes console 101, shear rate controller 102, motor 103, driving gear 104, and driven gear 105. Console 101 is fixed to the ground, and shear rate controller 102 is placed inside console 101 and connected to motor 103 through cables; In the experiment, the shear rate controller 102 sends an electrical signal to the motor 103 to maintain a constant mechanical rotation rate, causing the driving gear 104 connected to it to start rotating at a constant speed. This causes the driven gear 105 that is engaged with the driving gear 104 to start rotating at a constant speed, thereby causing the lower shear box 201 to rotate at a constant speed.

The subsystem of the ring shear device includes a lower shear box 201, a sample 202, and an upper shear box 203. The lower shear box 201 is mechanically connected to the driven gear 105 internally, so that both have the same rotational speed; Sample 202 is placed between the lower shear box 201 and the upper shear box 203, and the upper shear box 203 is connected to the pressure cap 301 to apply vertical pressure to sample 202.

The pressure control subsystem includes a pressure cap 301, a bearing 302, a fixing plate 303, a piston rod 304, and a piston 305. The pressure cap 301 contacts the upper shear box 203 and is connected to the piston rod 304 through the bearing 302; The piston rod sequentially passes through the piston 305, the upper bottom of the reaction kettle, and contacts the upper shear box 203 through the pressure cap 301; At the same time, a displacement sensor 801 is installed on the side of the piston rod to control the vertical pressure applied to the sample and connect it to the signal processor 803 through wired means. The signal transmission of the data acquisition and feedback device 804 is quickly obtained, so that the vertical pressure applied to the sample can be controlled in a timely manner; The inner chamber of piston 305 is connected to the air pressure supply subsystem to inflate and deflate the inner chamber of piston 305, so as to control the vertical pressure applied to sample 202.

The temperature control subsystem includes a constant temperature box 401, which includes a refrigerator, cooling tube, temperature control liquid, and heat exchanger. When the temperature is adjusted (usually set at 3° C.), the temperature control liquid is input into the cooling tube after the temperature stabilizes to maintain the temperature of the reactor chamber 004; The first gas cylinder 502 is connected to the refrigeration box heat exchanger. After reaching the predetermined temperature and stabilizing, methane gas is injected into the inner chamber 004 of the reaction kettle through the inlet and outlet 005 of the pressure pipe to synthesize hydrated soil containing natural gas.

The gas supply and recovery subsystem includes a first vent valve 501, a first gas cylinder 502, a first pressure sensor 503, a first pressure gauge 504, a first pressure regulating valve 505, a high-pressure valve 506, a second pressure regulating valve 507, a low-pressure valve 508, a gas recovery valve 509, and a gas recovery device 510. Among them, the first gas cylinder 502 passes through a first pressure regulating valve 505, a high-pressure valve 506, a second pressure regulating valve 507, a low-pressure valve 508, and a first pressure gauge 504 The first pressure sensor 503 and the first vent valve 501 are connected to the reactor chamber 004 through the inlet and outlet 005 of the pressure pipe to provide methane gas and pressure for the reactor chamber 004; At the same time, the first pressure sensor 503 is connected to the data acquisition and feedback device 804 through the signal processor 803, and timely transmits signals to the data acquisition and feedback device 804, in order to control the pressure of the reactor chamber 004 in a timely manner; The gas recovery device 510 is connected to the inner chamber 004 of the reaction kettle through the gas recovery valve 509 and the inlet and outlet 005 of the pressure pipe. It is mainly used to recover the gas generated by the decomposition of hydrated soil containing natural gas after the completion of the experiment.

The vacuum environment generation subsystem includes a vacuum pump 601 and a vacuum valve 602. The vacuum pump 601 is sequentially connected to the inner chamber of the reaction kettle through the vacuum valve 602 and the inlet and outlet 005 of the pressure pipe. It is used to exclude other gases from the inner chamber of the reaction kettle 004 and generate a vacuum environment in the experiment.

The pneumatic supply subsystem includes a second gas cylinder 701, a third pressure regulating valve 702, a reset valve 703, a second vent valve 704, a pressurization valve 705, a second pressure gauge 706, a second pressure sensor 707, and a reset vent valve 708. The second gas cylinder 701 is connected to the upper inner chamber of piston 305 through the third pressure regulating valve 702, a reset valve 703, and a second vent valve 704; At the same time, the second gas cylinder 701 is connected to the lower inner chamber of piston 305 through a third pressure regulating valve 702, a pressurizing valve 705, a second pressure gauge 706, a second pressure sensor 707, and a reset vent valve 708 to control the vertical pressure applied to the sample by adjusting the pressure in the upper and lower inner chambers of piston 305; At the same time, the second pressure sensor 707 is connected to the data acquisition and feedback device 804 through the signal processor 803, and timely transmits signals to the data acquisition and feedback device 804. By adjusting the pressure of the upper and lower inner cavities of the piston 305 in a timely manner, the vertical movement of the piston rod 304 is controlled, providing stable and suitable pressure for the sample.

The data acquisition and monitoring subsystem includes a displacement sensor 801, a temperature sensor 802, a signal processor 803, and a data acquisition and feedback device 804. Among them, the displacement sensor 801 is set on the outer side of the piston rod and connected to the data acquisition and feedback device 804 in a wired manner through the signal processor 803, used to measure and adjust the vertical displacement of the piston rod; At the same time, the temperature sensor 802 is installed on the right side of the reaction kettle shell 001 and connected to the data acquisition and feedback device 804 in a wired manner through the signal processor 803, for measuring and adjusting the temperature of the inner chamber 004 of the reaction kettle; Meanwhile, the signal processor 803 is connected to the data acquisition and feedback device 804 in a wired manner for the transmission of data and signals.

Test Method for Determining Interface Mechanical Parameters of Hydrated Soil Containing Natural Gas Refer to FIGS. 1 to 4. The interface mechanical parameter testing method for determining interface mechanical parameters of natural gas hydrated soil provided by the embodiments of the present invention is based on the interface mechanical parameter testing device provided by the present invention. The interface mechanical parameter testing method for natural gas hydrated soil includes the following steps:

Step S1: Obtain the soil sample to be tested;
Step S2: Load the soil sample to be tested into the sample loading mechanism;
Step S3: Assemble the sample loading mechanism to the interface mechanical parameter testing device of the hydrated soil containing natural gas provided by the present invention;
Step S4: Start the atmosphere adjustment mechanism, eliminate impurities and gases in the reaction kettle, and obtain a reaction kettle with a set vacuum degree;
Step S5: Fill the reaction kettle with set vacuum degree with working gas, so that the gas pressure in the reaction kettle reaches the set pressure;
Step S6: Wait until the working gas penetrates into the soil sample to be tested;
Step S7: Start the temperature adjustment mechanism to stabilize the temperature inside the reaction kettle to the set temperature;
Step S8: Synthesize hydrated soil samples containing natural gas under set pressure and temperature conditions;
Step S9: Start the pressure mechanism and apply working pressure to the hydrated soil sample containing natural gas;
Step S10: Start the rotating power mechanism to rotate the natural gas hydrated soil sample at the set speed, and perform the ring shear test on the natural gas hydrated soil sample until the end of the ring shear test;
Step S11: Unload the hydrated soil sample containing natural gas and recover the working gas.

Specifically,

The interface mechanical parameter testing method for determining interface mechanical parameters of natural gas hydrated soil provided by the embodiment of the present invention includes sample obtaining step, vacuum environment generation step, gas source supply step, constant temperature synthesis of natural gas hydrated soil step, synthesis judgment step of natural gas hydrated soil step, sample pressurization step, ring shear step, and gas recovery step.

The sample forming steps include: before the experiment, adding suitable soil layer by layer into the downward shear box 201 and compacting it according to the requirements of different physical parameters of the samples. Then, the soil sample 202, along with the lower shear box 201 and upper shear box 203, are placed in the inner chamber 004 of the reaction kettle and fixed on the driven gear 105, and the reaction kettle is sealed.

The steps for generating a vacuum environment include: first, opening vacuum valve 602, then closing the first vent valve 501, high-pressure valve 506, low-pressure valve 508, and gas recovery valve 509 in sequence, opening vacuum pump 601, removing impurities from the reactor chamber 004, and adjusting the internal pressure of vacuum pump 601 in a timely manner based on the pressure value measured by the first pressure gauge 504 until all impurities are completely eliminated from the reactor.

The gas supply step includes: after the impurities in the inner chamber 004 of the reaction kettle are completely eliminated, close the vacuum valve 602 and vacuum pump 601 in sequence, and then open the first gas cylinder 502, high-pressure valve 506, or low-pressure valve 508 (or open both high-pressure valve 506 and low-pressure valve 508) to inflate the inner chamber 004 of the reaction kettle, At the same time, the pressure in the inner chamber 004 of the reaction kettle should be adjusted through the first pressure regulating valve 505 or the second pressure regulating valve 507 (or both), and the pressure value measured by the first pressure gauge 504 should be adjusted in a timely manner until the pressure in the inner chamber 004 of the reaction kettle stabilizes to the required value.

The step of synthesizing hydrated soil containing natural gas at constant temperature includes: when the pressure in the inner chamber 004 of the reaction kettle stabilizes to the required pressure, wait for a period of time until the gas permeates into the sample, then open the constant temperature chamber 401, maintain the temperature inside the chamber at 3° C., and after the temperature stabilizes, inject temperature control liquid into the cooling pipe to stabilize the temperature of the inner chamber 004 of the reaction kettle. At this time, the inner chamber 004 of the reaction kettle should be in a continuous inflation state, while observing the first pressure gauge 504, When the value of the first pressure gauge 504 reaches the required pressure again, close high-pressure valve 506 or low-pressure valve 508 in sequence (or simultaneously close high-pressure valve 506 and low-pressure valve 508), and at the same time, start signal processor 803 and data acquisition and feedback device 804 to collect data.

The determination steps for the synthesis of natural gas containing hydrated soil include continuously observing the values of the first pressure gauge 504 or the first pressure sensor 503 collected. When the pressure in the reactor chamber 004 remains stable (the pressure should be between 3-6 MPa when methane gas is introduced), it indicates that the synthesis of natural gas containing hydrated soil is completed.

The sample pressurization steps include: after the synthesis of natural gas hydrated soil is completed, close the reset vent valve 708 and reset valve 703 in sequence, then open the second vent valve 704, pressurization valve 705, and second gas cylinder 701 to deflate the lower chamber of piston 305 and inflate the upper chamber. At the same time, adjust the pressure value of the upper chamber of piston 305 through the third pressure regulating valve to control the vertical pressure exerted by piston rod 304 on sample 202 through the pressure cap 301, At this point, the value of the second pressure gauge 706 should be observed. When the value of the second pressure gauge 706 reaches the target value and remains stable, close the second vent valve 704, pressurization valve 705, and second gas cylinder 701 in sequence.

The steps of ring shear include: after sample 202 is pressurized and maintained at the same pressure, the control console 101 should be turned on to input the target shear rate to the shear rate controller 102. At this time, the motor 103 will receive a signal from the shear rate controller 102 through wired means and drive the driving gear 104 to rotate at a constant speed, while the driving gear 104 drives the driven gear 105 to rotate at a constant speed, Thus, the lower shear box 201 and the driven gear 105 rotate at the same speed to perform ring shear on sample 202.

The gas recovery steps include: after the ring shear test is completed, turn off the power supply of control console 101; Open the reset vent valve 708 to vent the upper chamber of piston 305, then open the reset valve 703 and the second gas cylinder 701 to inflate the lower chamber of piston 305, so that the piston rod 304 moves upwards to unload the sample. After unloading, close the second gas cylinder 701, reset valve 703, and reset vent valve 708; Then open the gas recovery valve 509 and the first vent valve 501; Then increase the temperature of incubator 401 (which can reach around 26° C.) to decompose the hydrated soil containing natural gas, and the recovery of the decomposed products of hydrated soil containing natural gas needs to continue for more than 24 hours; After the gas recovery device 510 is completed, close the constant temperature box 401, the first vent valve 501, and the gas recovery valve 509. Seal the gas recovery device 510 and measure the volume of the recovered gas; Then turn off the power supply of signal processor 803 and data acquisition and feedback device 804; Then carry out the cleaning work after the experiment is completed.

Although preferred embodiments of the present invention have been described, those skilled in the art may make additional changes and modifications to these embodiments once they have knowledge of the basic creative concepts. Therefore, the attached claims are intended to be interpreted as including preferred embodiments and all changes and modifications falling within the scope of the present invention.

Obviously, technicians in this field can make various modifications and variations to the present invention without departing from the spirit and scope of the present invention. In this way, if these modifications and variations of the present invention fall within the scope of the claims and their equivalents, the present invention is also intended to include these modifications and variations.

The invention claimed is:

1. An interface mechanical parameter testing device for containing natural gas hydrated soil, characterized in that the device includes a reaction kettle, a rotating power mechanism, a sample loading mechanism, a pressure mechanism, an atmosphere regulating mechanism, and a temperature regulating mechanism, wherein
   a sample of the natural gas hydrated soil to be tested is set on the sample loading mechanism, and the sample and the sample loading mechanism are jointly located in a first holding chamber of the reaction kettle;
   the rotating power mechanism outputs rotating power through the output axis to the sample loading mechanism, causing the sample loading mechanism to rotate;
   the pressure mechanism provides testing pressure to the sample through the sample loading mechanism;
   the atmosphere regulating mechanism regulates atmosphere composition and gas pressure in the first holding chamber; and
   the temperature regulating mechanism regulates a temperature in the first holding chamber.

2. The interface mechanical parameter testing device for containing natural gas hydrated soil according to claim 1, characterized in that the sample loading mechanism comprises a lower shear box and an upper shear box,
   the sample to be tested is set between the lower shear box and the upper shear box.

3. The interface mechanical parameter testing device for containing natural gas hydrated soil according to claim 1, characterized in that the rotating power mechanism comprises a rotating motor, a driving gear, and a driven gear,
   the output shaft of the rotating motor is fixedly connected to the core shaft of the driving gear,
   the position of the spindle of the driven gear is fixed,
   the driven gear meshes with the driving gear;
   the sample loading mechanism is concentric with the driven gear, causing the sample loading mechanism to rotate coaxially with the driven gear.

4. The interface mechanical parameter testing device for containing natural gas hydrated soil according to claim 1, characterized in that the pressure mechanism comprises a pressure cap, a piston rod, and a piston limit member,
   the pressure cap is pressed against the sample loading mechanism through its feet,
   the piston limiting member is fixedly connected to the reaction kettle,
   the reaction kettle is provided with a through hole, and the piston limit member is provided with a blind hole, The through hole is aligned with the blind hole, and one end of the piston rod is arranged in the blind hole, the other end of the piston rod passes through the through hole and is connected to the pressure cap through a bearing;
   the piston rod, the side wall of the blind hole, and the side wall of the through hole both form a moving pair, by adjusting the displacement of the piston rod, the force applied by the piston rod to the pressure cap is adjusted.

5. The interface mechanical parameter testing device for containing natural gas hydrated soil according to claim 4, characterized in that it also includes a pressure medium supply mechanism;
   the blind hole has a first expanding section in the middle part;
   the piston rod has a second expanding section in the middle part;
   the axial height of the first expanding segment is greater than that of the second expanding segment, resulting in the first expanding segment being separated by the second expanding segment to form an upper and lower containing cavities,
   the pressure medium supply mechanism is respectively connected to the upper and lower holding cavities, and the displacement of the piston rod is adjusted by adjusting the volume of the pressure medium flowing into the upper or lower holding cavities.

6. The interface mechanical parameter testing device for containing natural gas hydrated soil according to claim 4, characterized in that it also includes a displacement sensor, the displacement sensor is used to indicate the displacement of the piston rod.

7. The interface mechanical parameter testing device for containing natural gas hydrated soil according to claim 1, characterized in that the atmosphere regulating mechanism comprises a first gas cylinder, a vacuum pump, and a gas pipeline, the first gas cylinder is connected to the upper and lower holding chambers respectively through the gas pipeline, so that the displacement of the piston rod can be adjusted by changing the gas volume flowing into the upper and lower holding chambers;

the vacuum pump is connected to the first holding chamber through a gas pipeline, enabling the first holding chamber to be adjusted to a set vacuum degree by the vacuum pump.

8. The interface mechanical parameter testing device for containing natural gas hydrated soil according to claim 1, characterized in that the atmosphere regulating mechanism also includes a gas recovery device, the gas recovery device is connected to the first holding chamber through the gas pipeline, enabling the application of the interface mechanical parameter testing device containing natural gas hydrated soil to complete the testing test and recover the working gas to the gas recovery device.

9. The interface mechanical parameter testing device for containing natural gas hydrated soil according to claim 1, characterized in that the temperature regulating mechanism comprises a constant temperature box and a temperature sensor, the reaction kettle is arranged in the constant temperature box, the temperature sensor is used to indicate the temperature inside the incubator.

10. A method for testing interface mechanical parameters for containing natural gas hydrated soil, characterized in that the method for testing interface mechanical parameters of natural gas hydrated soil is based on any of the interface mechanical parameter testing devices of natural gas hydrated soil according to claim 1, the method for testing interface mechanical parameters of natural gas hydrated soil includes the following steps:

obtain a soil sample to be tested;

loading the soil sample to be tested into the sample loading mechanism;

assemble the sample loading mechanism to any of the interface mechanical parameter testing devices for containing natural gas hydrated soil as claimed in claim 1;

start the atmosphere regulating mechanism, remove impurities and gases from the reaction kettle, and obtain a reaction kettle with a set vacuum degree;

fill the reaction kettle with a set vacuum degree with working gas, so that the gas pressure in the reaction kettle reaches the set pressure;

wait until the working gas penetrates into the soil sample to be tested;

start the temperature regulating mechanism to stabilize the temperature inside the reaction kettle to the set temperature;

synthesize the hydrated soil sample containing natural gas under the set pressure and temperature conditions;

activate the pressure mechanism to apply working pressure to the hydrated soil sample containing natural gas;

activate the rotating power mechanism to rotate the natural gas hydrated soil sample at a set speed, and perform a ring shear test on the natural gas hydrated soil sample until the end of the ring shear test;

unload the hydrated soil sample containing natural gas and recover the working gas.

\* \* \* \* \*